United States Patent [19]

McDonald

[11] Patent Number: 5,622,227

[45] Date of Patent: Apr. 22, 1997

[54] MULTI-FUNCTIONED FARM IMPLEMENT FOR TREATING SOIL

[76] Inventor: Kevin G. McDonald, 3304 Jamestown Dr., Modesto, Calif. 95354

[21] Appl. No.: 306,685

[22] Filed: Sep. 15, 1994

[51] Int. Cl.[6] .................................................. A01B 49/02
[52] U.S. Cl. ........................ 172/146; 172/150; 172/151; 172/170; 172/177; 172/180; 172/668
[58] Field of Search ................................... 172/174, 140, 172/177, 180, 668, 664, 687, 170, 153, 152, 151, 150, 149, 146, 145

[56] References Cited

U.S. PATENT DOCUMENTS

| | | | |
|---|---|---|---|
| 193,999 | 8/1877 | Sanders et al. | 172/153 X |
| 275,501 | 4/1883 | Lafeber | 172/151 |
| 366,879 | 7/1887 | Ristvedt | 172/151 |
| 1,611,358 | 12/1926 | Miller | 172/177 X |
| 3,490,539 | 1/1970 | Hilmes et al. . | |
| 3,826,315 | 7/1974 | Blair . | |
| 3,827,505 | 8/1974 | Sosalla . | |
| 3,831,685 | 8/1974 | Birkenbach . | |
| 3,921,727 | 11/1975 | Andersen et al. . | |
| 3,924,694 | 12/1975 | Baughman et al. . | |
| 4,006,781 | 2/1977 | van der Lely et al. . | |
| 4,212,254 | 7/1980 | Zumbahlen | 172/177 X |
| 4,315,547 | 2/1982 | Rau et al. | 172/177 X |
| 4,537,262 | 8/1985 | van der Lely | 172/151 X |
| 4,615,396 | 10/1986 | Arnold . | |

FOREIGN PATENT DOCUMENTS

| | | | |
|---|---|---|---|
| 2619677 | 3/1989 | France | 172/151 |
| 2613020 | 9/1977 | Germany | 172/177 |
| 2752764 | 5/1979 | Germany | 172/151 |
| 2841790 | 4/1980 | Germany | 172/177 |
| 6800520 | 7/1969 | Netherlands | 172/177 |
| 1079188 | 3/1984 | U.S.S.R. | 172/153 |
| 1249575 | 10/1971 | United Kingdom | 172/687 |

OTHER PUBLICATIONS

Comfort Manufacturing Company "Vibra–Spring Field Conditioners" Brochure, Aug. 1980.
Kverneland Seed Bedder Brochure, Jan., 1983.
Lawrence Edwards "Kombi–Cult" Advertisement in *Power Farming*, vol. 64, No. 8, p. 20, Aug., 1985.
Brochure of Bomford's Dyna–Drive Ground Driven Cultivator.
Brochure of Forrest City's DO–ALL Farm Implement.
Brochure of Unverferth's Rolling Harrow II Soil Conditioner (published 1989).
Brochure of John Deere's Seedbed Tillage Implements.
Richardson Mulch Treader brochure—Jul. 1984.
Series 5000 Sunflower Field Cultivator brochure—1987.
Series 6000 Sunflow Land Finisher brochure—1991.
Series 6332 Sunflower Land Finisher Operator's Manual (1 year prior to Sep. 15, 1993).

*Primary Examiner*—Terry Lee Melius
*Assistant Examiner*—Christopher J. Novosad
*Attorney, Agent, or Firm*—Shook, Hardy & Bacon L.L.P.

[57] ABSTRACT

A farm implement has a rigid frame from which is supported a mechanism for breaking and loosening compacted soil. A first plurality of S-tines are supported by the frame and disposed behind the breaking and loosening mechanism. Each S-tine has a sweep disposed on a lower end thereof. A reel is supported by the frame and disposed behind the first plurality of S-tines. The reel has a plurality of blades for chopping debris and breaking soil clods. A second plurality of S-tines are supported by the frame and disposed in offset rows behind the reel. Each S-tine has a sweep disposed on a lower end thereof. A roller mechanism is rotatably supported by the frame and disposed behind the second plurality of S-tines. The roller mechanism mixes and blends the soil with a rolling action. A finished roller breaks down remaining dirt clods and seals moisture in the ground.

10 Claims, 3 Drawing Sheets

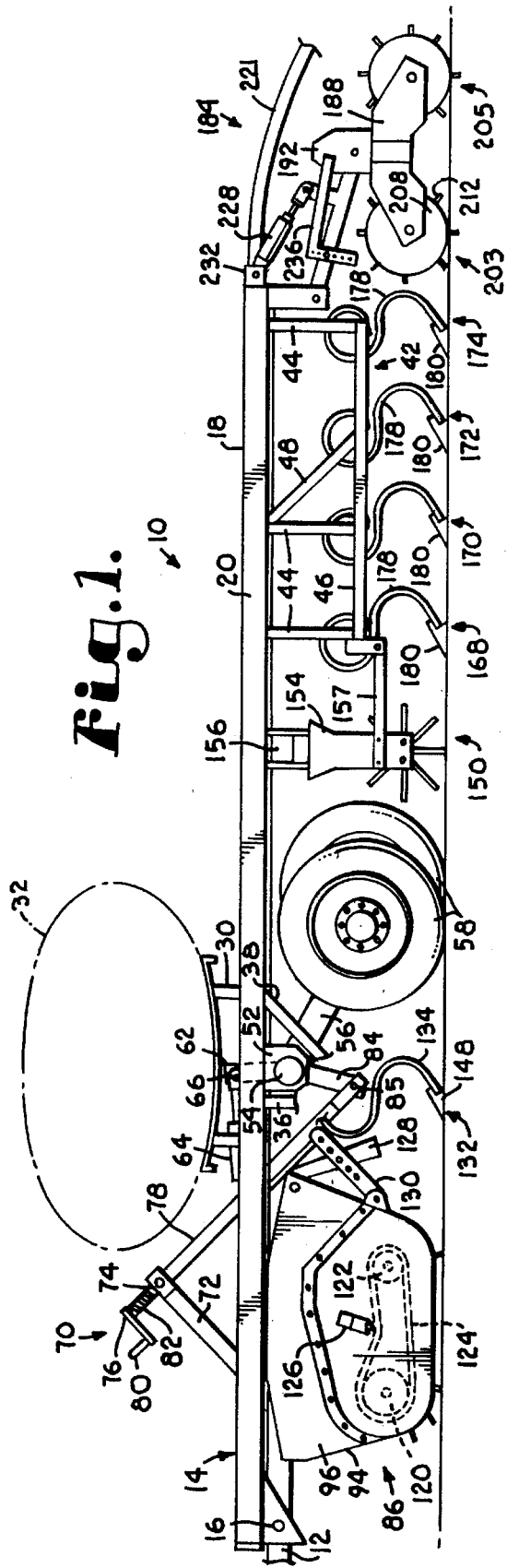
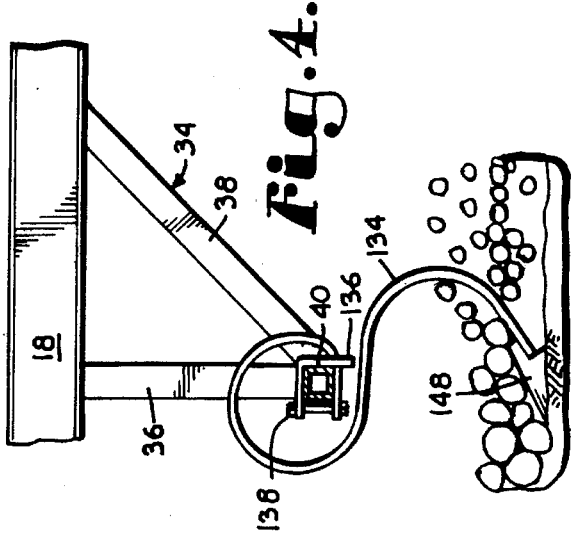
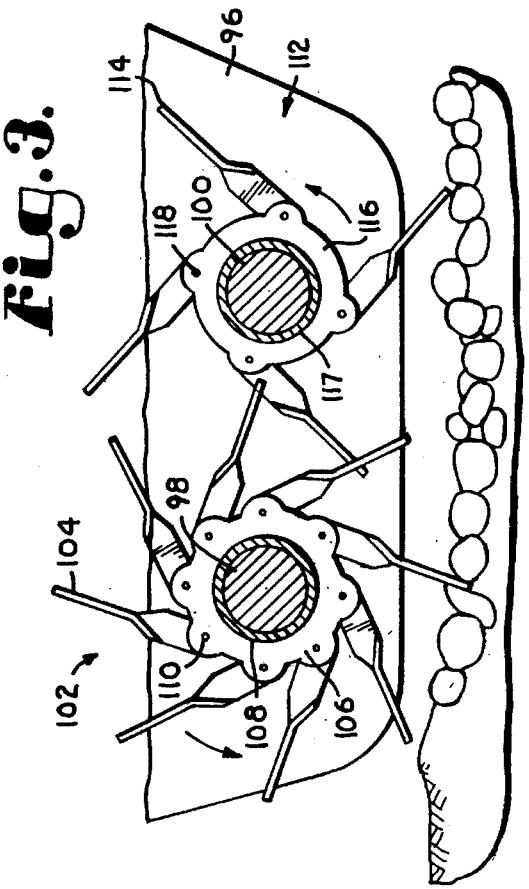

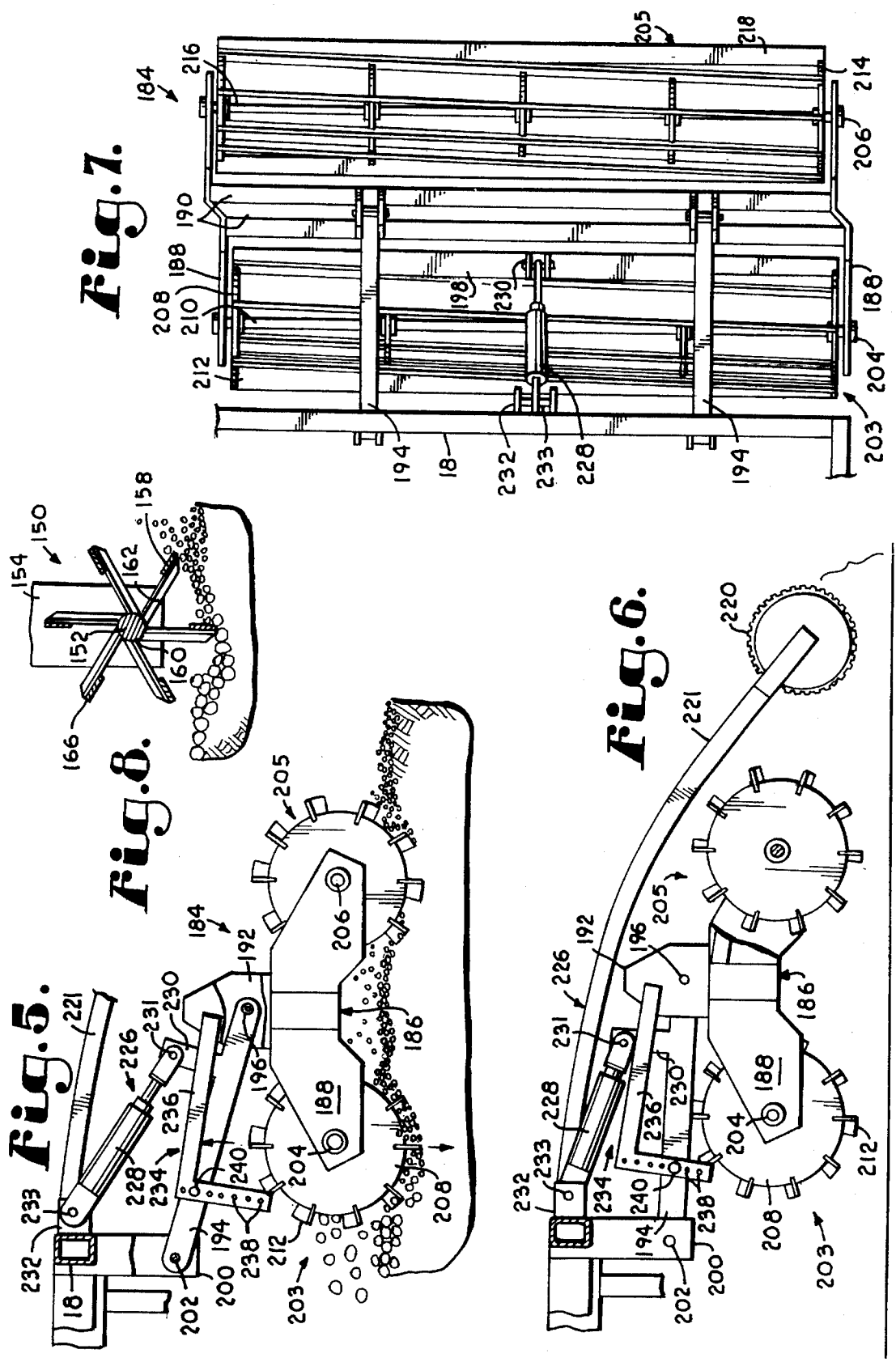

MULTI-FUNCTIONED FARM IMPLEMENT FOR TREATING SOIL

BACKGROUND OF THE INVENTION

The present invention is directed to a farm implement that prepares a seedbed for planting.

Farmers for years have been searching for an implement which would allow them to convert compacted soil into a level seedbed with a consistent depth and providing excellent conditions for planting of a crop. It is also desirable for grass or stubble growing or disposed on top of the soil to be worked into or under the seedbed so that it does not interfere with a planting implement passing through the seedbed.

Farmers have used a variety of implements to attempt to provide their fields with a loose, level seedbed of a consistent depth. For instance, a farmer might first work the entire field with a v-chisel, chisel plow or disk implement to loosen and break compacted soil. The farmer may then work the entire field with an implement having a plurality of S-tines or C-shanks with sweeps disposed on the lower end thereof to further mix the soil and attempt to break down some of the larger soil clods. Thereafter, a farmer sometimes uses an implement with a reel having a plurality of blades for breaking clods into smaller sizes and chopping up the debris still remaining on the top of the soil. In yet a fourth pass over the entire ground, a farmer may use an implement having rows of rollers, each roller having a plurality of longitudinal blades disposed about its periphery. The rollers serve to mix and blend the soil conditioned from the previous passes through the field with the other implements. Such rollers serve to position and incorporate the debris under and within the seedbed.

Multiple passes with different implements as described above do not necessarily provide a level seedbed with a consistent depth and can cause compaction of the soil, especially moist soil which can reduce crop yields. During the multiple passes with different implements, the implement being used typically bounces and rocks as it is pulled across the field. Thus, the first implement pulled across the field will not have a consistent cultivation depth, but will have a cultivation depth that varies depending upon the location in the field. As a second implement is pulled through the field thereafter, the second implement will also rock and bounce as it is being pulled. As is apparent, the second implement will not rock and bounce in a manner identical to that of the first implement. Thus, the cultivation depth of each implement is likely to be different and the conditioning of the soil provided by the implements is likely to be inconsistent because of the above-described conditions. The inconsistencies in the soil condition and seedbed depth are multiplied each time a pass is made through a field with a different implement.

As is also apparent, attempting to set different implements such that they operate at the exact same depth is likely to be very difficult if not impossible. Each implement will have a different depth setting structure with different adjustments and calibrations. Therefore, the use of multiple passes with multiple implements to prepare a level seedbed with a consistent depth is impractical in most instances.

Further, the multiple pass, multiple implement techniques described above do not allow for efficient incorporation of fertilizer or preemergent into a seedbed. More particularly, if a fertilizer or preemergent is applied to the top of the soil and not incorporated within a particular period of time, the effectiveness of the fertilizer or preemergent can be lost. Therefore, fertilizer or preemergent applied between passes of an implement can result in loss of effectiveness of the fertilizer or preemergent if the second pass is not made expeditiously. As is apparent, factors such as weather and equipment maintenance may prevent a farmer from being able to make an additional pass within the desired amount of time.

Other structures have been used in attempts to solve the problems described above. One such structure involves an implement having a front row of concave disks mounted on a shaft for breaking and loosening soil and throwing it to one side. Thereafter, various rows of C-shanks with sweeps disposed on their lower ends are positioned on the implement structure for passing through the soil. After the rows of C-shanks, various rows of straight, generally perpendicular tines are connected to the implement frame. The above-described implement does not always prepare the desired level, consistent seedbed needed for planting. More particularly, the implement does not effectively incorporate debris positioned on the top of the soil into the seedbed. The front row of disks simply throws the soil to one side and the other structures on the implement frame smooth the soil thereafter. Thus, debris such as stubble or grass remains on the top of the soil after the implement has passed, thus, interfering with planting. Further, the disks on the front of the implement tend to draw the implement into the soil as it is being pulled through the soil. The rigid C-shanks further draw the implement into the soil. This drawing of the implement into the soil further decreases the likelihood that a seedbed of consistent depth will result.

Thus, a farm implement is needed which will prepare a level seedbed with a consistent depth from unprepared compact soil in a single pass. Further, a farm implement is needed which will prepare a seedbed from unprepared compacted soil and incorporate into the seedbed debris which was previously positioned on top of the compacted soil.

SUMMARY OF THE INVENTION

One object of the present invention is to provide a farm implement which can prepare a level seedbed of consistent depth from unprepared or premoistened compacted soil with a single pass.

Another object of the invention is to provide a farm implement that incorporates grass or stubble positioned on the top surface of compacted soil into the seedbed.

A further object of the invention is to provide a farm implement that incorporates fertilizer or preemergent into a seedbed during preparation of the seedbed.

A still further object of the invention is to provide a farm implement wherein cultivating devices are spaced and particularly positioned on the frame of the implement so that the operation of each of the devices is maximized.

Another object of the invention is to provide a structure for varying the force that a roller mechanism applies to the soil to adjust the characteristics of the resulting seedbed.

According to the present invention, the foregoing and other objects are obtained by a farm implement having a rigid frame for supporting various cultivating devices. A first shaft is rotatably supported by the frame and has a plurality of sets of elongated tines spaced at locations along its length. Each set of tines has a plurality of tines spaced about the peripheral surface of the first shaft at the respective location of the set. A second shaft is rotatably supported by the frame and disposed behind the first shaft. The second shaft has a plurality of sets of elongated tines spaced at locations along its length. Each set of tines has a plurality of tines spaced about the peripheral surface of the shaft at the respective location of the set. A chain is coupled to both the first shaft and the second shaft such that the first shaft drives the second shaft at a 3:1 gear ratio to increase the velocity of the second shaft. A first row of S-tines is supported by the frame and disposed behind the second shaft. Each S-tine has a sweep disposed on a lower end thereof for creating a plurality of furrows in the soil. A third shaft is rotatably supported by the frame and disposed behind the first row of S-tines. The third shaft has a plurality of longitudinal blades spaced about its periphery. Each blade has a ground engaging edge for chopping debris, breaking soil clods and mixing the soil. A second, third, fourth, and fifth row of S-tines are supported by the frame. The rows are disposed one behind the other with the second row disposed behind the third shaft. Each S-tine has a sweep disposed on a lower end thereof. The rows of S-tines are offset with respect to each other to ensure more complete sweep coverage. A fourth shaft is rotatably supported by the frame and disposed behind the fifth row of S-tines. The fourth shaft has a plurality of longitudinal blades spaced about its periphery. The blades mix and blend the soil with a rolling action. A fifth shaft is rotatably supported by the frame and disposed behind the fourth shaft. The fifth shaft has a plurality of longitudinal blades spaced about its periphery. The blades mix and blend the soil with a rolling action.

In accordance with another aspect of the invention, the frame of the farm implement includes a movable support structure to which the fourth shaft and the fifth shaft are rotatably connected. At least one hydraulic cylinder is coupled to the movable structure and the remainder of the frame to apply variable force to the structure such that the force with which the blades of the fourth and fifth shaft engage the soil can be varied.

In accordance with a further aspect of the invention, the fourth shaft is located a predetermined distance behind the fifth row of S-tines such that the sweeps on the S-tines propel soil upwardly and rearwardly to load the blades of the fourth shaft to increase the mixing and blending action of the blades.

Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a side elevation view of a farm implement embodying the present invention, hidden structure shown in broken lines and parts being broken away to reveal details of construction;

FIG. 3 is an enlarged fragmentary, detailed end elevation view taken in vertical cross section along line 3—3 of FIG. 2 in the direction of the arrows, and showing the compacted soil loosening and breaking mechanism engaging the soil;

FIG. 4 is an enlarged fragmentary, detailed end elevation view taken in vertical cross section along line 4—4 in the direction of the arrows, and showing an S-tine and sweep engaging the soil;

FIG. 5 is an enlarged fragmentary, detailed end elevation view taken in vertical cross section along line 5—5 of FIG. 2 in the direction of the arrows, parts being broken away to reveal details of construction and showing the roller mechanism engaging the soil;

FIG. 6 is a view similar to FIG. 5, but showing the roller mechanism in one of its alternative positions;

FIG. 7 is an enlarged fragmentary top plan view of the roller mechanism;

FIG. 8 is an enlarged fragmentary, detailed end elevation view taken in vertical cross section along line 8—8 of FIG. 2 in the direction of the arrows, and showing the chopping and breaking reel engaging the soil.

DETAILED DESCRIPTION OF THE PREFERRED EMBODIMENTS

Figure 2:
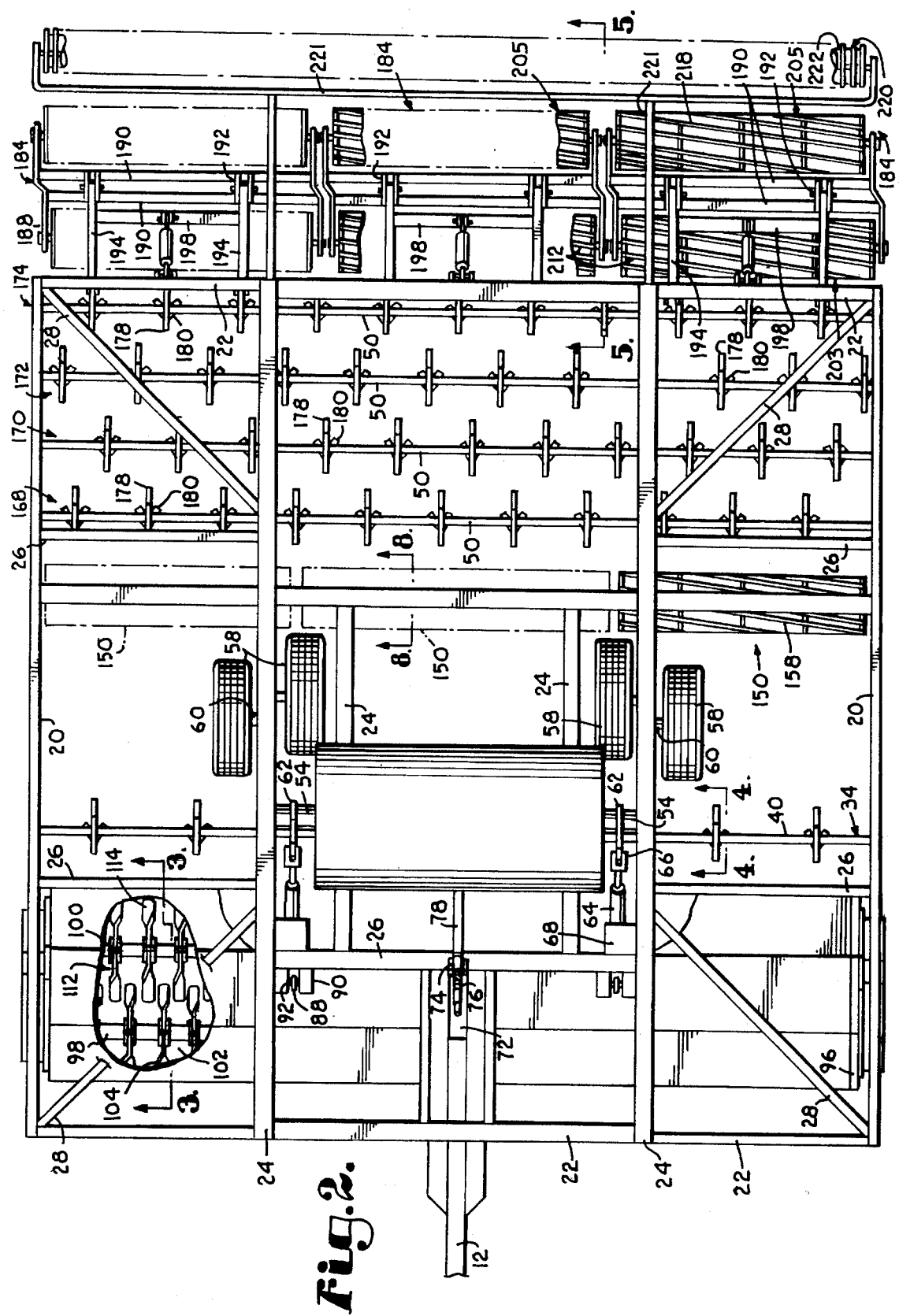
FIG. 2 is a top plan view of the farm implement of FIG. 1, parts being broken away to reveal details of construction and repetitive structure shown in phantom lines.

Turning now to the drawings in greater detail and initially to FIGS. 1 and 2, a farm implement of the present invention is designated generally by the numeral 10. The implement 10 has a hitch portion 12 and a rigid frame 14. The frame 14 is preferably made out of hollow steel beams with rectangular cross sections. The hitch 12 is pivotally attached to the frame 14 generally at a location 16 as best shown in FIG. 1. The forward portion (not shown) of the hitch 12 is attached to the hitching structure of a tractor or other vehicle for pulling the implement 10 through the soil. The frame 14 has an upper structure 18 which is formed by longitudinal support beams 20 and lateral support beams 22. The beams 20 and 22 form a generally rectangular structure. The structure 18 further has intermediate longitudinal support beams 24, intermediate lateral support beams 26, and slanted support beams 28. The beams 20, 22, 24, 26, and 28 lie in substantially the same horizontal plane and are connected together by welds, bolts or other suitable fastening mechanisms.

With reference to FIGS. 1 and 2, the structure 18 has a fertilizer tank holder 30 for holding a fertilizer tank 32 (shown in phantom lines). Fertilizer spraying equipment can be mounted anywhere longitudinally along the frame 14. Thus, spraying equipment can be disposed before or after any of the cultivating devices connected to the frame, such devices being more fully described below.

With reference to FIGS. 1, 2 and 4, the frame 14 also has an under structure 34 attached to the structure 18. The structure 34 has S-tines (which will be more fully described below) disposed thereon. The structure 34 has vertical members 36, slanted members 38, and a horizontal member 40. The members 36, 38 and 40 are preferably connected together and to the structure 18 by welding.

With reference to FIGS. 1 and 2, the frame 14 further has an under structure 42 attached to the structure 18. The structure 42 has vertical members 44, longitudinal horizontal members 46, slanted members 48, and lateral horizontal members 50. A plurality of S-tines are disposed in rows on the structure 42 as will be more fully described below. The members 44, 46, 48 and 50 are connected together and to the structure 18 by welds, bolts or other suitable fastening mechanisms.

With reference to FIGS. 1 and 2, a wheel pivoting flange 52 extends from the lower surfaces of beams 24. A wheel pivoting shaft 54 is pivotally received in apertures in the flanges 52. Wheel supporting members 56 are attached to the shaft 54. Each member 56 supports two wheels 58 such that they are offset with respect to each other on the member 56, as best shown in FIG. 2. The wheels 58 are connected to spindles which are offset on a center pivot shaft 60 that extends through member 56. Actuating members 62 are attached on one of their ends to the periphery of the shaft 54. The other ends of the members 62 are pivotally connected to raising and lowering cylinders 64 by a pivot pin arrangement 66. The other ends of the cylinders 64 are pivotally attached to the frame 14 at the locations generally indicated by the reference numeral 68. Thus, actuation of the cylinders 64 pivots the shaft 54 through the members 62. Pivoting of the shaft 54 thus provides for the raising and lowering of the wheels 58. As is apparent, this raising and lowering of the wheels 58 allows for movement of the implement on a road and further allows adjustment of the depth of the resulting seedbed.

Further, a depth adjusting arrangement 70 is also provided for adjusting the front or rear depth at which the implement 10 enters the soil. The arrangement 70 includes a slanted rigid member 72 which is attached to the top of the hitch 12. Pivotally attached to member 72 is a coupling 74 having an aperture (not shown) therein. A threaded shaft 76 is positioned through the coupling 74 and threadably received in an adjusting shaft 78. The shaft 76 has a handle 80 disposed on its top surface. Positioned in between the handle 80 and the coupling 74 and completely surrounding the shaft 76 is a coil spring 82. The lower end of the shaft 78 is pivotally attached to one end of a connecting member 84 by a pin arrangement 85. The other end of member 84 is rigidly connected to the shaft 54. Therefore, when the hydraulic cylinders 64 are pressurized such that the members 62 move towards the front of the implement and the wheels 58 raise, the handle 80 moves downwardly toward the coupling 74, causing load transfer to the rear of the implement 10. By turning the handle 80 to decrease the distance between the member 72 and member 84, the implement user can increase or decrease the front or back depth of the implement. Conversely, when the cylinders 64 are pressurized such that the wheels 58 are lowered, the handle 80 is moved downwardly. The wheels 58 can be moved upwardly by the cylinders 64 until the top surface of the shaft 78 abuts the coupling 74 and defines the raised position of the implement. This raised position allows transportation of the implement to other locations over roads or other surfaces.

With reference to FIGS. 1, 2, and 3, a compacted soil breaking and loosening mechanism 86 will be described. With particular reference to FIG. 2, the mechanism 86 is attached to the frame 14 by positioning of flanges 88 of mechanism 86 between flanges 90 attached to the frame 14. Each of the flanges 88 and 90 have apertures (not shown) disposed therein. In order to secure the mechanism 86 to the frame 14, pins 92 are positioned in the apertures of flanges 88 and 90 to secure the mechanism 86 thereto. The mechanism 86 is a cultivating device which is commercially available under the name "DYNA-DRIVE" manufactured by Bomford Turner LTD of Evesham Worcs., England. The mechanism 86 has a shell 94. The shell 94 has planar end panels 96 in between which a shaft 98 and a shaft 100 are disposed. More particularly, the shafts 98 and 100 are rotatably connected to the end panels 96 through a bearing structure or the like.

With particular reference to FIGS. 2 and 3, the shaft 98 has sets 102 of elongated tines 104 positioned at spaced locations along its length. An attaching ring 106 is used to attach the tines 104 to a peripheral surface 108 of the shaft 98. The tines 104 are then attached to the ring 106 by bolts 110. With particular reference to FIG. 3, the tines 104 are angled away from the direction of rotation of the shaft 98 (as indicated by the arrow). Adjacent sets 102 of the tines 104 are circumferentially offset with respect to each other such that the tines 104 in adjacent sets 102 do not longitudinally align.

With reference to FIGS. 2 and 3, the shaft 100 has sets 112 of tines 114 at spaced locations along its length. With particular reference to FIG. 2, sets 112 are spaced such that they are longitudinally offset from sets 102 on the shaft 98. Therefore, the areas of rotation of tines 104 and tines 114 are offset and partially overlap. An attaching ring 116 is positioned about the peripheral surface 117 of shaft 100. The tines 114 are attached to the attaching ring 116 by bolts 118. The tines 114 are angled in the direction of rotation of the shaft 100 (as indicated by the arrow).

With reference to FIG. 1, a sprocket 120 is positioned on one end of the shaft 98 and a sprocket 122 is positioned on one end of the shaft 100 adjacent one of the panels 96. The sprockets 120 and 122 are connected by a chain 124 (shown in broken lines) such that the shaft 98 drives shaft 100 at a 3:1 gear ratio to increase the rotational velocity of shaft 100. A chain tightener 126 is also positioned on the panel 96 adjacent the sprockets 120 and 122.

The front of the shell 94 is open such that sets 102 of tines 104 can fully engage the compacted soil as shown in FIG. 3. A hinged door 128 is pivotally attached to the rear of the shell 94 and can be held at various angular positions by an adjusting member 130. The door 128 can be used to adjust the trajectory of the soil thrown by sets 112 of tines 114 on the shaft 100.

The mechanism 86 serves to break and loosen compacted soil. The mechanism 86 is the first device on the frame 14 to contact the compacted soil. As shown in FIG. 3, tines 104 and 114 are pulled through the soil to lift and break up the hardest soil surfaces.

Positioned behind the mechanism 86 is a first row 132 of S-tines 134. With reference to FIGS. 1 and 4, the S-tines 134 are attached to the member 40 of the structure 34 by attaching members 136 and bolts 138. An end of member 136 has an aperture (not shown) through which the S-tine 134 is received. The other end of the member 136 has an aperture (not shown) for receiving bolt 138. Further, the upper end of the S-tine 134 also has an aperture (not shown) for receiving a bolt 138. Thus, the member 136 and the S-tine 134 can be positioned about the member 40 and tightened thereon by the bolt 138 as shown in FIG. 4. The S-tines 134 are spaced along the length of the member 40. The S-tines 134 are preferably spaced such that the space between adjacent S-tines is approximately 22 inches. The lower end of the S-tines 134 has a sweep or tooth 148. Preferably, the sweeps 148 are 4 inches in width. Further, the S-tines 134 are preferably ½ inch S-tines.

With particular reference to FIG. 4, the S-tines 134 are shown engaging the soil broken by the mechanism 86. The S-tines 134 mix the soil and leave 3–5 inch furrows along with clods and stubble, the furrows allowing maximum performance of the cultivating device located behind the row 132.

With reference to FIGS. 1, 2 and 8, the next devices attached to the frame 14 are chopping and breaking reels 150. The reels 150 are preferably of the type commercially available under the name "DO-ALL" manufactured by Forrest City Machine Works, Inc. of Forrest City, Ark. Each reel 150 has a shaft 152 which is rotatably supported by attaching flanges 154 by suitable bearing arrangements. The flanges 154 are attached, preferably by a bolt arrangement, to a lateral support beam 156. The beam 156 is attached to the bottom surface of the structure 18, such as by welds, bolts or other fastening mechanisms.

Each reel 150 has blades 158 attached to its outer peripheral surface 160 through attaching members 162. The members 162 are preferably welded to a peripheral surface 160 and the blades 158 are preferably bolted to the members 162. The blades 158 have ground engaging edges 166. The blades 158 are pitched or angled with respect to the longitudinal axis of the shaft 152 when attached to the members 162 as best shown in FIG. 2. This pitch is caused by adjacent sets of members 162 being circumferentially offset such that when the blades 158 are attached thereto, the blades are twisted about their longitudinal axis and pitched with respect to the longitudinal axis of the shaft 152. The reels 150 are preferably approximately 18 inches in diameter. The furrows formed by row 132 of S-tines 134 allow the reels 150 to work at maximum performance to chop stubble or other debris and to break clods while mixing the loosened soil. The reels 150 perform this action by rotating as the implement is pulled through the soil such that the edges 166 of the blades 158 perform the chopping and breaking function.

As shown in FIG. 1, the flanges 154 further can be supported by the support members 157 to prevent rearward stresses thereon. The members 157 are connected to the flanges 154 and also to the forward portion of the structure 42.

With reference to FIGS. 1, 2, and 4, rows 168, 170, 172 and 174 of S-tines 178 will be described. The S-tines 178 are identical to the S-tines 134 in the row 132 described above. The S-tines 178 of the rows 168, 170, 172, and 174 are attached to the members 50 in the same manner the S-tines 134 of the row 132 are attached to the member 40, the latter attaching arrangement shown in FIG. 4 and described above. With particular reference to FIG. 2, the S-tines 178 are disposed in rows 168, 170, 172 and 174 such that each row of S-tines is offset in the lateral direction from the adjacent row of S-tines. Each S-tine 178 in each row is spaced from adjacent S-tines by approximately 20 inches. The S-tines 178 of the rows 168, 170, 172, and 174 each have a sweep or tooth 180 disposed on its lower end to engage the ground. Sweeps 180 are preferably approximately 7 inches in width. Because of the offset nature of the S-tines 178 in the rows 168, 170, 172, and 174, the sweeps 180 offer complete coverage of the soil along the entire width of the implement 10.

The sweeps 180 in the rearward row 174 throw loosened soil upwardly and rearwardly into the air when the implement is pulled through the ground. This propelling of soil by the row 174 serves to load cultivating devices behind the row as will be more fully described below.

The rows 168, 170, 172 and 174 mix and blend the loosened soil which has been broken down by the reels 150 and mechanism 86. The broken down soil from the reels 150 and mechanism 86 allows the S-tines 178 with their sweeps to optimally perform.

With reference to FIGS. 1, 2, and 5–7, roller mechanisms 184 will be described. Three roller mechanisms 184 are positioned across the rear of the implement. Each mechanism 184 has movable or swingable support structures 186 as best shown in FIGS. 5–7. The structures 186 have end panels 188 that are connected by horizontal beams 190.

Attaching flanges 192 are connected to the upper surface of the beams 190. The flanges 192 are used to swingably connect the structure 186 to the frame 14 through swingable connecting members 194. The rearward ends of the members 194 are pivotally connected to the flanges 192 through pin arrangements 196. The members 194 are connected together by lateral support members 198. The forward ends of members 194 are pivotally connected to attaching flanges 200 of the frame 14. The flanges 200 are connected to the rearwardmost of the beams 22 of the structure 18. The forward ends of the members 194 are pivotally connected to respective flanges 200 by pin arrangements 202.

Each roller mechanism 184 has a forward roller 203 with a shaft 204 and a rearward roller 205 with a shaft 206. The shafts 204 and 206 are rotatably supported between the panels 188. The shafts 204 and 206 are supported by the panels 188 with any suitable bearing arrangement. The shaft 204 has circular attaching portions 208 disposed at locations along its peripheral surface 210 as best shown in FIGS. 2 and 5–7. The members 208 are used to support blades 212. The members 208 are preferably attached to the shaft 204 by welding and the blades 212 are preferably attached to the members 208 by welding. The blades 212 are pitched or angled with respect to the longitudinal axis of the shaft 204 when they are connected to the members 208 as best shown in FIGS. 2 and 7. That is, the blades 212 are twisted about their longitudinal axis when attached to the members 208 such that they are angled or pitched with respect to the shaft 204. Further, the blades 212 of the roller 203 preferably are angled slightly forwardly toward the direction of rotation of the roller 203.

The rear roller 205 also has circular attaching members 214 connected to a peripheral surface 216 of the shaft 206 at spaced locations. The members 214 have blades 218 attached thereto. The members 214 are preferably attached to the shaft 206 by welding and the blades 218 are preferably attached to the member 214 also by welding. The blades 218 also are pitched or angled with respect to the longitudinal axis of the shaft 206. That is, the blades 218 are twisted about their longitudinal axis when they are attached to the members 214 such that they are pitched or angled with respect to the longitudinal axis of the roller 205. The blades 218 of the roller 205 preferably are angled slightly forwardly toward the direction of travel of the roller 205. The rollers 203 and 205 preferably have a diameter of approximately 14 inches.

With reference to FIGS. 1, 2, 5, and 6, a finishing roller 220 can be located behind the rear roller 205. Finishing roller 220 is rotatably supported by support frame 221. Support frame 221 extends from and is connected to the rearwardmost of beams 22 of the structure 18. Finishing roller 220 is a solid roller and has nubs 222 disposed circumferentially along its peripheral surface. The finishing roller 220 with nubs 222 serves to further break down any remaining dirt clods and serves to seal moisture into the ground. The finishing roller 220 is preferably 9½ inches in diameter.

The roller mechanisms 184 have adjusting arrangements 226 for adjusting the amount of force the rollers 203 and 205 apply to the soil. Each adjusting arrangement 226 has a hydraulic cylinder 228 with a rear end pivotally connected to a connecting flange 230 on the member 198 by a pin arrangement 233. The forward end of the cylinder 228 is pivotally attached by the pin arrangement 233 to a flange 232 which is connected to the rearward end of the frame 14. Thus, as the cylinders 228 are pressurized, force is applied to the swingable structures 186 such that force is applied by the rollers 203 and 205 to the soil as shown in FIG. 5. As is apparent, the cylinders 228 can be used to apply variable pressure to the soil through the rollers 203 and 205 to thus obtain the desired soil condition of a seedbed. The cylinders 228 simply can be hooked up to the hydraulic system of the tractor and can thus be adjusted by the machine operator even when the implement is being pulled through the soil.

Further, with reference to FIGS. 5 and 6, each roller mechanism 184 can have a tilt adjusting arrangement 234. Each adjusting arrangement 234 has an L-shaped adjusting member 236 which is attached on one end to one of the flanges 192 preferably by welding. The other end of adjusting member 236 has a plurality of apertures 238 disposed therein. The apertures 238 can be aligned with an aperture (not shown) in one of swingable connecting members 194. A pin 240 is received through one of the apertures 238 and the aperture in the connecting member 194 such that the roller mechanism can be locked in a tilted position. In order to change the tilted angle of the roller mechanism, the pin 24 is removed and the mechanism pivoted about the pin arrangement 196 such that the aperture in the connecting member 194 aligns with an appropriate aperture 238. The pin 248 is then replaced to lock the mechanism into its new tilted position. An adjusting arrangement 234 is located adjacent each of the connecting members 194, such that the roller mechanisms will be adequately locked into their tilted positions. Adjusting the tilt of the roller mechanisms allows the implement user to adjust the flow of soil through the mechanism to prevent clogging of the rollers.

With reference to FIGS. 1–8, the operation of the implement 10 will be described. The implement 10 is first connected to a tractor or other pulling mechanism by the hitch 12 and the appropriate hydraulic hookups are made to the tractor. The implement is then lowered into the soil using the cylinders 64 as described above. The depth to which the implement engages the soil can be adjusted by stops in cylinders 64. As the implement is pulled through the soil, the mechanism 86 is the first device on the implement to engage compacted soil. The mechanism 86 serves to break and loosen the compacted soil. The mechanism 86 provides this function by having tines 104 and tines 114 engage the compacted soil with the rotating motion of the shafts 98 and 100, respectively. The shafts 98 and 100 are connected together by the chain 124 such that shaft 100 is driven at a greater velocity to increase mixing and chopping and thorough breaking of compacted soil with an upward action, as best shown in FIG. 3.

After compacted soil has been loosened by the mechanism 86, the row 132 of S-tines 134 then engages the loosened soil with its sweeps 148. The row 132 blends and mixes the soil leaving 3–5 inch furrows and bringing clods and stubble to the surface. The row 132 is preferably spaced approximately 28 inches behind the central longitudinal axis of the shaft 100.

The reels 150 then engage the soil furrowed by the row 132. The furrows formed by the row 132 allow the reels 150 to operate at maximum performance because the mounds formed by the furrows allow the blades 158 to more efficiently chop debris and break clods remaining in the soil. As the reels 150 rotate, the blades 158 engage the soil to effectively chop stubble, break clods, and incorporate material into the seedbed. The reels 150 are preferably located approximately 82 inches behind the row 132 of S-tines 134.

After the reels 150 pass through the soil, the rows 168, 170, 172 and 174 of S-tines 178 pass through the soil. As described above, the rows of S-tines are offset from one another such that maximum coverage of the soil is obtained as the rows pass through. Further, because the soil has been conditioned by the reel 150 and mechanisms 86, the rows of the S-tines are allowed to operate at maximum performance to further mix and incorporate debris into the seedbed. The arrangement of the four rows of S-tines ensures that the soil passed over by the implement is adequately mixed and conditioned by the S-tines. The S shape of the tines provides a spring action to the sweeps disposed on the lower edge thereof. Thus, the S-tines are deformed rearwardly as they are pulled through the ground, therefore providing for the mixing and blending action by propelling soil upwardly and rearwardly. The rows 168, 170, 172, and 174 of S-tines are preferably spaced approximately 18 inches from the adjacent rows of S-tines.

As shown in FIG. 5, soil thrown by the sweeps 180 of the rearward row 174 of S-tines 178 serves to load front rollers 203 with soil by feeding soil to the upper portions of the rollers. This "feeding" allows the rollers 203 to operate at maximum performance because more soil is inputted into the rollers to increase the mixing and blending action of the rollers. In order to ensure that soil from the row 174 is adequately loaded into the rollers 203, the central longitudinal axes of the shafts 204 preferably are spaced approximately 18 inches behind the row 174. Such a distance will ensure that when the implement is pulled through a field at approximately 7 miles per hour, dirt will be adequately loaded into the front rollers 203.

As described above, the front rollers 203 serve to mix, blend and condition the seedbed as shown in FIG. 5. Further, the rollers 203 propel dirt upwardly and rearwardly to load the rear rollers 205 to thus maximize the performance of the rollers 205. The central longitudinal axes of the shafts 206 are located approximately 24 inches behind the central longitudinal axes of the shafts 204. The rollers 205 serve to further blend and mix the soil and to ensure that any debris is incorporated into the seedbed. Further, the force with which the rollers 203 and 205 engage the soil can be adjusted by the adjusting arrangement 226. Thus, by adjusting the hydraulic pressure supplied to the cylinders 228, a farmer can vary the force the rollers 203 and 205 apply to the soil to form a loose or firm seedbed.

The finishing roller 220 is the last device on the implement and serves to break down any remaining clods, smooth the soil, and seal in moisture.

Thus, the implement 10 in a single pass takes compacted soil and transforms it into a smooth seedbed of consistent depth without waves or ruts. More particularly, because the cultivating devices described above are supported by a single frame, the seedbed will have a consistent depth. Thus, the problems associated with multiple passes with multiple different implements resulting in inconsistent depth and conditions of a seedbed are eliminated.

It is important to have the devices in the order described above to ensure that each of the cultivating devices operates optimally. That is, each cultivating device provides soil conditions that allow the subsequent cultivating device to operate at maximum performance. More particularly, compacted soil is first loosened and broken by the mechanism 86. The mechanism 86 thus allows the row 132 of S-tines 134 to operate at maximum performance to further mix the soil and to provide furrows. The furrows provided by the row 132 then allow the chopping and breaking reels 150 to operate at maximum performance. After the reels 150 have chopped debris and decreased soil clod sizes, the four rows of S-tines operate on the smaller particles of soil to optimally mix the soil. Further, because each row of S-tines is offset from adjacent rows of S-tines, the rows operate in combination to ensure that soil is mixed and conditioned across the entire width of the implement. Further, the last row of S-tines ensures that soil is propelled rearwardly and upwardly into the rollers 203. This loading of the rollers 203 allows them to operate at maximum performance because the maximum amount of soil that can be accommodated by the rollers 203 is provided. Thus, the rollers 203 perform their mixing and blending function optimally. The rollers 203 in turn propel soil into the rear rollers 205 to load them. Thus, the rollers 205 are also allowed to operate at maximum potential. The finishing roller 220 is then used to break down any remaining clods and seal off the moisture in the seedbed.

Additionally, because the cultivating devices on the implement 10 tend to roll or spring across the soil, the implement is not drawn into the soil as it is pulled therethrough. That is, the mechanism 86, the reels 150 and the rollers 203 and 205 all tend to rotate over the soil without being drawn into it. Further, the shape of the S-tines 134 and 178 allow them to be deformed rearwardly and, thus, prevent the tines from being drawn into the soil as they are pulled therethrough. Therefore, because the implement 10 does not tend to be drawn into the soil as it is pulled over it, a seedbed can be obtained with a more consistent depth.

The implement 10 also allows easy incorporation of fertilizer or preemergent into the soil. Fertilizer spray booms (not shown) are preferably mounted in front of the mechanism 86. Thus, the mixing and blending actions of each of the cultivating devices on the implement ensures that fertilizer or preemergent is thoroughly assimilated into the soil before the fertilizer or preemergent can lose any of its effectiveness.

Furthermore, the adjusting arrangement 228 can be used to apply variable force to the rollers 203 and 205 to thus individualize and adjust the looseness or firmness of the seedbed.

Additionally, the frame 14 of the implement 10 can be adapted such that a grain drill or planter can be pulled behind or mounted, thus preparing the seedbed and planting in a single pass.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A farm implement comprising:

a frame;

a first shaft rotatably supported by said frame, said first shaft having a plurality of sets of elongated tines spaced at locations along its length, each set of tines having a plurality of tines spaced about the peripheral surface of said first shaft at the respective location of said set;

a second shaft rotatably supported by said frame and disposed behind said first shaft, said second shaft having a plurality of sets of elongated tines spaced at locations along its length, each set of tines having a plurality of tines spaced about the peripheral surface of said shaft at the respective location of said set;

a third shaft rotatably supported by said frame and disposed behind said second shaft, said third shaft having a plurality of longitudinal blades spaced about its periphery, each blade having a ground engaging edge for chopping debris and breaking soil clods;

first, second, third, and fourth rows of S-tines supported by said frame, said rows disposed one behind the other with said first row disposed behind said third shaft, each S-tine having a sweep disposed on a lower end thereof, and wherein said rows of S-tines are offset with respect to each other;

a fourth shaft rotatably supported by said frame and disposed behind said fourth row of S-tines, said fourth shaft having a plurality of longitudinal blades spaced about its periphery to mix and blend the soil with a rolling action;

a fifth shaft rotatably supported by said frame and disposed behind said fourth shaft, said fifth shaft having a plurality of longitudinal blades spaced about its periphery to mix and blend the soil with a rolling action; and wherein a movable support structure to which said fourth shaft and said fifth shaft are connected is attached to said frame, and wherein at least one hydraulic cylinder is coupled to said movable structure and to said frame to apply variable force to said structure such that the force with which said blades of said fourth and fifth shafts engage the soil can be varied.

2. The farm implement of claim 1, further comprising a finishing roller supported by said frame and disposed behind said fifth shaft to break any remaining soil clods and seal loose soil.

3. The farm implement of claim 1, wherein said fourth shaft is located a predetermined distance behind said fourth row of S-tines such that said sweeps on said S-tines propel soil upwardly and rearwardly to load said blades of said fourth shaft to increase the mixing and blending action of said blades.

4. The device of claim 1, wherein each of said blades of said third, fourth, and fifth shafts is pitched with respect to the longitudinal axis of its respective shaft.

5. A farm implement comprising:

a frame;

means, supported by said frame, for breaking and loosening compacted soil, said breaking and loosening means including a first shaft rotatably supported by said frame said first shaft having a plurality of sets of elongated tines spaced at locations along its length, each set of tines having a plurality of tines spaced about the peripheral surface of said first shaft at the respective location of said set;

a second shaft rotatably supported by said frame and disposed behind said first shaft, said second shaft having a plurality of sets of elongated tines spaced at locations along its length, each set of tines having a plurality of tines spaced about the peripheral surface of said shaft at the respective location of said set;

a chain coupled to both said first shaft and said second shaft such that said first and second shafts rotate at the same velocity;

a reel, rotatably supported by said frame and disposed behind said breaking and loosening means, said reel having a plurality of blades for chopping debris and breaking soil clods;

a plurality of S-tines supported by said frame and disposed in offset rows behind said reel, each S-tine having a sweep disposed on a lower end thereof;

roller means, rotatably supported by said frame and disposed behind said plurality of S-tines, for mixing and blending the soil with a rolling action; and adjusting means for adjusting the amount of force said roller means apply to the soil.

6. The farm implement of claim 5, wherein said adjusting means includes at least one hydraulic cylinder coupled to said roller means to apply variable force thereto.

7. The farm implement of claim 5, wherein said roller means includes:

a first shaft rotatably supported by said frame and disposed behind said plurality of S-tines, said first shaft having a plurality of longitudinal blades spaced about its periphery, said blades mixing and blending the soil with a rolling action; and a second shaft rotatably supported by said frame and disposed behind said first shaft, said second shaft having a plurality of longitudinal blades spaced about its periphery, said blades mixing and blending the soil with a rolling action.

8. The farm implement of claim 7, wherein said roller means is located a predetermined distance behind the most rearwardly disposed row of said plurality of S-tines such that said sweeps on said S-tines propel soil upwardly and rearwardly to load said blades of said roller means to increase the mixing and blending action of said blades.

9. The farm implement of claim 7, wherein each of said blades of said first and second shafts are pitched with respect to the longitudinal axis of its respective shaft.

10. A farm implement comprising:

a frame;

means, supported by said frame, for breaking and loosening compacted soil;

a reel, rotatably supported by said frame and disposed behind said breaking and loosening means, said reel having a plurality of blades for chopping debris and breaking soil clods;

a plurality of S-tines supported by said frame and disposed in offset rows behind said reel, each S-tine having a sweep disposed on a lower end thereof;

roller means, rotatably supported by said frame and disposed behind said plurality of S-tines, for mixing and blending the soil with a rolling action;

adjusting means for adjusting the amount of force said roller means apply to the soil; and a finishing roller supported by said frame and disposed behind said roller means, said finishing roller breaking any remaining soil clods and sealing loose soil.

* * * * *